United States Patent
Fang et al.

(10) Patent No.: US 10,200,864 B2
(45) Date of Patent: Feb. 5, 2019

(54) METHOD AND DEVICE FOR MANAGING WIRELESS ACCESS POINT

(71) Applicant: SHANGHAI LIANSHANG NETWORK TECHNOLOGY CO., LTD., Shanghai (CN)

(72) Inventors: WeiJun Fang, Shanghai (CN); WenKui Li, Shanghai (CN); Hui Yang, Shanghai (CN)

(73) Assignee: Shanghai Lianshang Network Technology Co., Ltd., Shanghai (CN)

( * ) Notice: Subject to any disclaimer, the term of this patent is extended or adjusted under 35 U.S.C. 154(b) by 0 days.

(21) Appl. No.: 15/883,865

(22) Filed: Jan. 30, 2018

(65) Prior Publication Data
US 2018/0176781 A1   Jun. 21, 2018

Related U.S. Application Data

(63) Continuation of application No. PCT/CN2016/070674, filed on Jan. 12, 2016.

(30) Foreign Application Priority Data

Aug. 5, 2015  (CN) .......................... 2015 1 04741089

(51) Int. Cl.
  *H04W 4/00* (2018.01)
  *H04W 12/06* (2009.01)
  *H04W 12/00* (2009.01)

(52) U.S. Cl.
  CPC ........... *H04W 12/06* (2013.01); *H04W 12/00* (2013.01)

(58) Field of Classification Search
  CPC .............................. H04W 12/06; H04W 12/08
  See application file for complete search history.

(56) References Cited

U.S. PATENT DOCUMENTS

| | | | |
|---|---|---|---|
| 9,622,081 B1 * | 4/2017 | Satish | H04W 12/10 |
| 2010/0008259 A1 | 1/2010 | Yoon et al. | |

(Continued)

FOREIGN PATENT DOCUMENTS

| | | |
|---|---|---|
| CN | 102665197 A | 9/2012 |
| CN | 103889029 A | 6/2014 |

(Continued)

OTHER PUBLICATIONS

International Search Report dated May 5, 2016, issued in related International Patent Application No. PCT/CN2016/070674.

*Primary Examiner* — Omoniyi Obayanju
(74) *Attorney, Agent, or Firm* — Kilpatrick Townsend & Stockton LLP

(57) ABSTRACT

The present application aims to provide a method and device for managing a wireless access point (AP), so as to address the problem of the difficulty in identifying the actual owner of the wireless AP when multiple users share the password of the wireless AP. In particular, in the technical solution provided by the present application, wireless AP-related first authentication information of a first user is acquired, and then owner information of a wireless AP can be automatically determined according to ownership related information of the wireless AP and the first authentication information, thereby conveniently and efficiently determining an owner of the wireless AP. Furthermore, the owner information can be more accurately determined by reasonably configuring a priority level of the authentication information, so as to assign the ownership of the wireless AP to the actual owner.

12 Claims, 3 Drawing Sheets

(56) References Cited

U.S. PATENT DOCUMENTS

2015/0312240 A1* 10/2015 Fu ..................... H04W 76/10
                                              726/5
2016/0156635 A1* 6/2016 Liu .................... H04W 12/06
                                              726/4

FOREIGN PATENT DOCUMENTS

| CN | 104243213 A | 12/2014 |
|----|-------------|---------|
| CN | 104519020 A | 4/2015 |
| CN | 104618346 A | 5/2015 |
| WO | 2015073519 A1 | 5/2015 |

* cited by examiner

METHOD AND DEVICE FOR MANAGING WIRELESS ACCESS POINT

CROSS-REFERENCES TO RELATED APPLICATIONS

The present application is a continuation of PCT Application No. PCT/CN2016/070674, filed Jan. 12, 2016, which claims priority to Chinese Application No. CN2015104741089, filed Aug. 5, 2015, the entire contents of which are herein incorporated by reference for all purposes.

TECHNICAL FIELD

The present application relates to the field of computers, and in particular to a method and device for managing a wireless access point.

BACKGROUND

In a scenario where a wireless access point is shared, many users will provide free wireless access points for use by other users. For example, a merchandiser user shares the name and an access password for a wireless access point off-line, and mobile terminals of other users (e.g., customers coming into the stores) can acquire the name and the access password for the free wireless access point, so that the mobile terminals can be automatically connected to the wireless access point when entering a coverage range of the free wireless access point. At a server end, it is necessary to determine which user the owner of the shared wireless access point is, thereby providing the relevant control and management authorities to the owner to manage the wireless access point. For example, the function of editing introduction information about the wireless access point is provided for the merchant providing the wireless access point, comprising the name of a merchant, the reputation of the merchant, the promotions of the merchant, the information about a route to the merchant, etc. However, there is currently no solution that can determine the owner of the wireless access point.

BRIEF SUMMARY

An object of the present application is to provide a method and device for managing a wireless access point.

According to one aspect of the present application, provided is a method for managing a wireless access point, the method comprising:
  acquiring first authentication information on a wireless access point provided by a first user; and
  determining owner information of the wireless access point according to ownership related information of the wireless access point and the first authentication information.

Further, the ownership related information comprises at least one of the following:
  ownership-pending state information of the wireless access point;
  current authentication information provided by the current owner of the wireless access point; and
  second authentication information on the wireless access point provided by a second user.

Further, the ownership related information comprises the ownership-pending state information of the wireless access point;
  and determining owner information of the wireless access point according to ownership related information of the wireless access point and the first authentication information comprises:
  using the first user as the owner of the wireless access point.

Further, the ownership related information comprises the current authentication information provided by the current owner of the wireless access point;
  and determining owner information of the wireless access point according to ownership related information of the wireless access point and the first authentication information comprises:
  using the first user as the owner of the wireless access point when the first authentication information has a priority higher than that of the current authentication information.

Further, the ownership related information comprises the second authentication information on the wireless access point provided by the second user.
  and determining owner information of the wireless access point according to ownership related information of the wireless access point and the first authentication information comprises:
  by comparing the priorities of the first authentication information and the second authentication information, using the user corresponding to the authentication information with the higher priority as the owner of the wireless access point.

Further, the first authentication information comprises at least one of the following:
  an access password for the wireless access point;
  an MAC address corresponding to the wireless access point;
  device nameplate information corresponding to the wireless access point;
  information on SSID modification successfully operated of the wireless access point; and
  information on access password modification successfully operated of the wireless access point.

Further, the priorities of the first authentication information are ranked from low to high as:
  the access password for the wireless access point;
  the MAC address corresponding to the wireless access point;
  the device nameplate information corresponding to the wireless access point;
  the information on SSID modification successfully operated of the wireless access point; and
  the information on access password modification successfully operated of the wireless access point.

Further, the device nameplate information comprises at least one of the following: a manufacturer, a product model, an MAC address, a serial number, and a radio transmission device type approval code.

Further, the first authentication information comprises the device nameplate information corresponding to the wireless access point;
  and acquiring the first authentication information on the wireless access point provided by the first user comprises:
  receiving a device nameplate photo corresponding to the wireless access point from the first user, and identifying and acquiring the device nameplate information corresponding to the wireless access point from the device nameplate photo.

Further, acquiring the first authentication information on the wireless access point provided by the first user comprises:
receiving the first authentication information on the wireless access point from the first user; and
verifying the first authentication information, and acquiring the verified first authentication information.

Further, acquiring the first authentication information on the wireless access point provided by the first user comprises:
acquiring a management operation request for the wireless access point by the first user, wherein the management operation request comprises the first authentication information on the wireless access point.

The method further comprises:
performing the management operation request on the wireless access point when the first user matches the owner information.

Further, the method further comprises:
acquiring a management operation request for the wireless access point by a third user,
and performing the management operation request on the wireless access point when the third user matches the owner information.

Further, the method further comprises:
providing owner information-related information to a user equipment wirelessly connected to the wireless access point.

According to another aspect of the present application, further provided is a device for managing a wireless access point, the device comprising:
a first means for acquiring first authentication information on a wireless access point provided by a first user; and
a second means for determining owner information of the wireless access point according to ownership related information of the wireless access point and the first authentication information.

Further, the ownership related information comprises at least one of the following:
ownership-pending state information of the wireless access point;
current authentication information provided by the current owner of the wireless access point; and
second authentication information on the wireless access point provided by a second user.

Further, the ownership related information comprises the ownership-pending state information of the wireless access point;
and the second means is configured to use the first user as the owner of the wireless access point.

Further, the ownership related information comprises the current authentication information provided by the current owner of the wireless access point;
and the second means is configured to use the first user as the owner of the wireless access point when the first authentication information has a priority higher than that of the current authentication information.

Further, the ownership related information comprises the second authentication information on the wireless access point provided by the second user;
and the second means is configured to use, by comparing the priorities of the first authentication information and the second authentication information, the user corresponding to the authentication information with the higher priority as the owner of the wireless access point.

Further, the first authentication information comprises at least one of the following:
an access password for the wireless access point;
an MAC address corresponding to the wireless access point;
device nameplate information corresponding to the wireless access point;
information on SSID modification successfully operated of the wireless access point; and
information on access password modification successfully operated of the wireless access point.

Further, the priorities of the first authentication information are ranked from low to high as:
the access password for the wireless access point;
the MAC address corresponding to the wireless access point;
the device nameplate information corresponding to the wireless access point;
the information on SSID modification successfully operated of the wireless access point; and
the information on access password modification successfully operated of the wireless access point.

Further, the device nameplate information comprises at least one of the following: a manufacturer, a product model, an MAC address, a serial number, and a radio transmission device type approval code.

Further, the first authentication information comprises the device nameplate information corresponding to the wireless access point;
and the first means is used to receive a device nameplate photo corresponding to the wireless access point from the first user, and to identify and acquire the device nameplate information corresponding to the wireless access point from the device nameplate photo.

Further, the first means is used to receive the first authentication information on the wireless access point from the first user, to verify the first authentication information, and to acquire the verified first authentication information.

Further, the first means is used to acquire a management operation request for the wireless access point by the first user, wherein the management operation request comprises the first authentication information on the wireless access point.

And, the device further comprises:
a third means for performing the management operation request on the wireless access point when the first user matches the owner information.

Further, the device further comprises:
a fourth means for acquiring a management operation request for the wireless access point by a third user, and performing the management operation request on the wireless access point when the third user matches the owner information.

Further, the device further comprises:
a fifth means for providing owner information-related information to a user equipment wirelessly connected to the wireless access point.

In comparison with the prior art, in some embodiments of the present application, first authentication information on a wireless access point of a first user is acquired, owner information of the wireless access point can then be automatically determined according to ownership related information of the wireless access point and the first authentication information, and an owner of the wireless access point can thus be conveniently determined.

In addition, in different cases, the ownership related information may be ownership-pending state information of the wireless access point, current authentication information provided by the current owner of the wireless access point, or second authentication information on the wireless access point provided by a second user. Accordingly, in some solutions of the present application, different manners may be used to complete the determination of the owner in combination with the first authentication information so as to adapt to different application scenarios, making the applicability of the solution better.

BRIEF DESCRIPTION OF THE DRAWINGS

Other features, objects, and advantages of the present application will become more apparent upon reading of the detailed description of non-limiting embodiments made with reference to the following accompanying drawings in which.

The same or similar reference numerals in the drawings refer to the same or similar parts.

DETAILED DESCRIPTION

The present application will be further described in detail below in conjunction with the accompanying drawings.

In a typical configuration of the present application, a terminal, a device for a serving network, and a trusted party all comprise one or more processors (CPUs), an input/output interface, a network interface and a memory.

The memory may comprise a non-permanent memory, a random access memory (RAM) and/or a non-volatile memory, such as a read-only memory (ROM) or a flash memory (flash RAM), and other forms of memories in a computer-readable medium. The memory is an example of the computer-readable medium.

The computer-readable medium comprises permanent and non-permanent, and removable and non-removable media, and information storage can be implemented by means of any method or technology. Information may be a computer-readable instruction, a data structure, a program module or other data. Examples of a storage media for a computer comprise, but are not limited to, a phase change memory (PRAM), a static random access memory (SRAM), a dynamic random access memory (DRAM), other types of random access memory (RAM), read only memory (ROM), electrically erasable programmable read-only memory (EE-PROM), flash memory or other memory technology, a read-only compact disk read-only memory (CD-ROM), a digital versatile disc (DVD) or other optical storage, a magnetic cartridge type tape, a magnetic tape storage or other magnetic storage devices or any other non-transmission medium that can be used to store information that can be accessed by a computing device. As defined herein, the computer-readable medium does not comprise non-transitory computer-readable media, such as modulated data signals and carriers.

Figure 1:
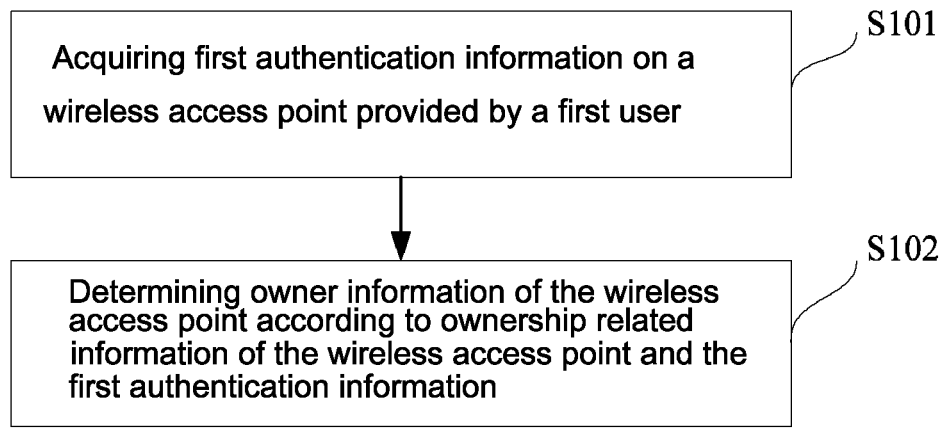
FIG. 1 is a flow chart of a method for managing a wireless access point provided in embodiments of the present application.

FIG. 1 shows a method for managing a wireless access point provided in embodiments of the present application, the method comprising the following several steps:

step S101, acquiring first authentication information concerning a wireless access point provided by a first user; and step S102, determining owner information about the wireless access point according to ownership related information about the wireless access point and the first authentication information.

Here, the method for managing a wireless access point may be executed by a management server of the wireless access point. The management server comprises, but is not limited to, a network host, a single network server, a plurality of network server sets, or a cloud computing-based computer set, or other implementations. Here, cloud is made up of a large number of host computers or network servers based on cloud computing, wherein the cloud computing is a kind of distributed computing, which is a virtual computer composed of a group of loosely coupled computer sets. The wireless access point is an access point of a mobile device of a user accessing a network, which may be for example a wireless-fidelity (WiFi) hotspot provided by a router.

The first user refers to a user who uses a mobile terminal to connect to a management server of a wireless access point and sends authentication information to the management server to attempt to acquire an ownership right of the wireless access point. The first authentication information refers to information sent by the aforementioned first user to the management server for authenticating the ownership right, the information being related to the wireless access point, the higher the priority thereof, indicating that the higher the degree of control of the wireless access point by the first user is, and accordingly, the greater the likelihood that the first user is determined to be the owner of the wireless access point.

In different scenarios, the ownership related information about the wireless access point may be at least one of the following:

ownership-pending state information about the wireless access point;

current authentication information provided by the current owner of the wireless access point; and second authentication information concerning the wireless access point provided by a second user.

For example, in a first case, where the ownership related information about the wireless access point is the ownership-pending state information about the wireless access point, in step S102, determining the owner information about the wireless access point according to the ownership related information about the wireless access point and the first authentication information specifically comprises: using the first user as the owner about the wireless access point. When a wireless access point does not currently have an owner, the wireless access point would be in an ownership-pending state, and the management server would store ownership-pending state information about the wireless access point, i.e. indicating that the wireless access point is in the ownership-pending state, and there is no owner at the moment. When the first authentication information (i.e., the first authentication information concerning the wireless access point provided by the first user) is acquired, a user who sends the first authentication information can be directly used as the owner, without making a comparison and determination, saving the processing time.

As another example, in a second case, where the ownership related information about the wireless access point is the current authentication information provided by the current owner of the wireless access point, in step S102, determining the owner information about the wireless access point according to the ownership related information about the wireless access point and the first authentication information specifically comprises: using the first user as the owner about the wireless access point when the first authentication information has a priority higher than that of the current authentication information. When a wireless access point currently has an owner, in this case different from the former case, the management server does not have ownership-pending state information about the wireless access point but would store the current authentication information provided by the current owner of the wireless access point. By taking a wireless access point A as an example, if the current owner thereof is a user a and the priority of authentication information a (i.e., the current authentication information) provided by the user a for acquiring an ownership right of the wireless access point A is 2, when the management server receives authentication information b (i.e., the first authentication information) concerning the wireless access point A from another user b (i.e., the first user) and the priority of the authentication information b is 3, the user b is saved as the owner about the wireless access point because the priority of the authentication information b is higher than the priority of the authentication information a. Assuming that the authentication information a and the authentication information b have the same priority, different rules may be used depending on different scenario requirements. For example, if the priorities of the authentication information a and the authentication information b are identical in the present embodiment, the owner of the wireless access point A will not be changed, and the ownership right of the wireless access point A still belongs to the user a.

As still another example, in a third case, where the ownership related information about the wireless access point is the second authentication information concerning the wireless access point provided by the second user, in step S102, determining the owner information about the wireless access point according to the ownership related information about the wireless access point and the first authentication information specifically comprises: by comparing the priorities of the first authentication information and the second authentication information, using the user corresponding to the authentication information with the higher priority as the owner about the wireless access point. Here, the second user also refers to a user who uses a mobile terminal to connect to a management server of a wireless access point and sends authentication information to the management server to attempt to acquire an ownership right of the wireless access point, and the actual number of second user(s) may be either one or multiple.

In the aforementioned two cases, the determination processing of the owner information about a wireless access point is triggered by reception of the first authentication information concerning the wireless access point provided by the first user, that is, each time the authentication information concerning the wireless access point provided by the user is acquired, the determination processing is performed to determine the owner information. In the practical use, it is also possible to perform the determination processing of the owner information after receiving authentication information from a plurality of users, and the specific trigger condition may be based on a pre-set time or may be based on the number of pieces of received authentication information. For example, the number of pieces of received user authentication information is checked at intervals, if the user information is not received, no processing would be performed; if only one piece of authentication information is received, the processing may be performed with reference to the aforementioned first or second case; and if more than one piece of authentication information is received, the priorities of these authentication information are compared, and the user corresponding to the authentication information with a high priority is used as the owner information about the wireless access point. For the case of triggering according to the number of pieces of received authentication information, the comparison is made only when a set number (e.g., two, three, etc.) of pieces of authentication information is acquired, so as to determine the owner information about the wireless access point. In addition, in such a case, if the wireless access point currently has an owner, the current owner may also be used as one of the second users to compare the priorities of the authentication information so as to determine the owner information about the wireless access point.

Further, the authentication information, comprising the first authentication information about the first user, the second authentication information about the second user and the current authentication information about the current owner, may comprise at least one of the following: an access password for the wireless access point, a medium access control (MAC) address corresponding to the wireless access point, device nameplate information corresponding to the wireless access point, information on modification successfully operated about a service set identifier (SSID) of the wireless access point, and information on modification successfully operated about the access password for the wireless access point. The access password for the wireless access point is a password required to be input when a mobile device of a user establishes a connection with the wireless access point. The MAC address corresponding to the wireless access point is an MAC address of a physical device corresponding to the wireless access point. The device nameplate information corresponding to the wireless access point, i.e. the information on the nameplate of the physical device corresponding to the wireless access point, may be, for example, one of or a combination of more than one of a manufacturer, a product model, an MAC address, a serial number or a radio transmission device type approval code (CMIIT ID). The information on modification successfully operated about the SSID of the wireless access point indicates that the user is capable of modifying the SSID of the wireless access point and submit the modified SSID. By taking a wireless access point provided by a router as an example, the user may submit a login account and a login password for the router corresponding to the access point to indicate that the user is capable of modifying the SSID of the wireless access point, and in this example the information on modification successfully operated about the SSID of the wireless access point is the login account, the login password and the modified server identifier of the router corresponding to the wireless access point. The information on modification successfully operated about the access password for the wireless access point indicates that the user can modify the access password for the wireless access point and submit the modified access password. Still by taking the wireless access point provided by a router as an example, the user submits a login account and a login password for the router corresponding to the access point to indicate that the user is capable of modifying the access password for the wireless access point, and in this example the information on modification successfully operated about the access password for the wireless access point is the login account, the login password and the modified access password for the router corresponding to the wireless access point.

In the practical use, by rationally setting the priorities of authentication information, the accuracy when determining owner information can be improved. For example, in the present embodiment, for the above-mentioned authentication information, the priorities are set successively, from low to high: the access password for the wireless access point, the MAC address corresponding to the wireless access point, the device nameplate information corresponding to the wireless access point, the information on modification successfully operated about the SSID of the wireless access point and the information on modification successfully operated about the access password for the wireless access point. Still by taking the wireless access point A as an example, the authentication information a provided by the current owner of the wireless access point A, i.e. the user a, for acquiring the ownership right of the wireless access point A is the access password for the wireless access point, and the received authentication information b concerning the wireless access point A from another user b is the information on modification successfully operated about the access password for the wireless access point A. Since the priority of the information on modification successfully operated about the access password for the wireless access point A is higher than that of the access password for the wireless access point A, the user b is used as the owner information about the wireless access point A.

Further, when the first authentication information is the device nameplate information corresponding to the wireless access point, in step S101, acquiring the first authentication information concerning the wireless access point provided by the first user comprises: receiving a device nameplate photo corresponding to the wireless access point from the first user, and identifying and acquiring the device nameplate information corresponding to the wireless access point from the device nameplate photo. The device nameplate photo is a nameplate photo of a device providing the wireless access point photographed by the user, such as a nameplate on a router device. The information displayed on the nameplate would generally comprise the following contents: a manufacturer, a product model, an MAC Address, a serial number, a radio transmission device type approval code, etc. In the practical use, one or more of the above contents can be recognized by the device nameplate photo as the device nameplate information by means of various types of image recognition methods. Compared with the direct acquisition of the device nameplate information, since the acquisition of the device nameplate photo is more difficult, an ordinary user generally cannot provide same, for example, in the scenario where a merchant freely shares a wireless access point, a place where the router corresponding to the wireless access point is placed is generally only known to the merchant, that is, the ordinary user cannot easily photograph the nameplate photo of the router. Even if the ordinary user temporarily becomes an owner of the wireless access point shared by the merchant by sending an access password for the wireless access point, the merchant can also re-obtain the ownership right of the wireless access point by submitting the device nameplate photo, thereby improving the accuracy when determining the owner of the wireless access point and reducing the possibility of erroneous determination.

In addition, in step S101, acquiring first authentication information concerning the wireless access point provided by the first user may also comprise: receiving the first authentication information concerning the wireless access point provided by the first user, verifying the first authentication information, and acquiring the verified first authentication information. In the practical use, since the number of wireless access points that need to be managed is often very large, if the owner information is determined for each received first authentication information, it will need to take up a large amount of processing resources. Therefore, when the first authentication information concerning the wireless access point provided by the first user is received, the first authentication information can be verified, and if the verification of the first authentication information is not passed, the first authentication information received this time can be directly discarded, and then the subsequent processing is not performed. Only when the verification of the first authentication information is passed, the first authentication information is acquired as a basis for subsequent determination of owner information. Still by taking the aforementioned wireless access point A as an example, if the management server receives an access password concerning the wireless access point A of a user c, the access password would be first verified. The specific verification mode may be using the access password received concerning the wireless access point A to be compared with a correct access password for the wireless access point A pre-stored in the management server, and if the access password received this time is consistent with the pre-stored correct access password, the verification is passed, otherwise the verification fails. The pre-stored correct access password for the wireless access point A may be uploaded by the owner of the wireless access point. By taking the current owner, the user b, of the wireless access point A as an example, after the user b becomes the current owner of the wireless access point A, the relevant verification information concerning the wireless access point A can be sent to the management server for verifying the subsequent authentication information, such as the correct access password and the correct device nameplate information.

In the practical use, after determining an owner of a wireless access point, the owner can obtain a corresponding authority to manage the wireless access point. For example, by taking the scenario mentioned in the present embodiment as an example, the function of managing the wireless access point may be determining whether to share the wireless access point, to upload the verification information and to edit the introduction information concerning the wireless access point, such as the name of a merchant, the reputation of the merchant, the promotions of the merchant and information about a route to the merchant, etc. In order to implement the function of managing the wireless access point by a user, another method for managing a wireless access point provided in an embodiment of the present application further comprises: acquiring a management operation request concerning the wireless access point made by a third user, and executing the management operation request on the wireless access point when the third user matches the owner information. Here, it will be understood by those skilled in the art that the third user only represents a user who sends a management operation request regarding a wireless access point, which may be the same user as the first user in the practical use, and may be a user relevant to the first user.

In the case where the third user is the same user as the first user, for example, for the aforementioned wireless access point A, the user b becomes the owner of the wireless access point A after sending the authentication information, the information having the unique identification function such as the user name and the user number of the user b may be used as the owner information about the wireless access point A. Since the information such as the user name or the user number is unique, the user name or the user number can be used as a basis for matching the owner information. In this case, only when the user name or the user number is consistent with the owner information, it will be determined to match the owner information, and therefore, only the management operation request is received from the user b, the management operation request will be performed.

In addition, in the case where the third user and the first user are the relevant users, still by taking the aforementioned wireless access point A as an example, it is assumed that the user b and a user d belong to the same group of users, for example, the two belonging to two different users of the same merchant, and a piece of identical information can be set in the information about the users, for example, the same group number, etc. When the user b is used as the owner about the wireless access point A, the group number of the user b may be used as the owner information about the wireless access point A. When the management operation request is received from the user d, the group number can be used as a basis for matching the owner information, and if the group number of the third user is consistent with the owner information, it is determined to match the owner information, and the management operation request from the user d could be executed in this case.

Figure 2:
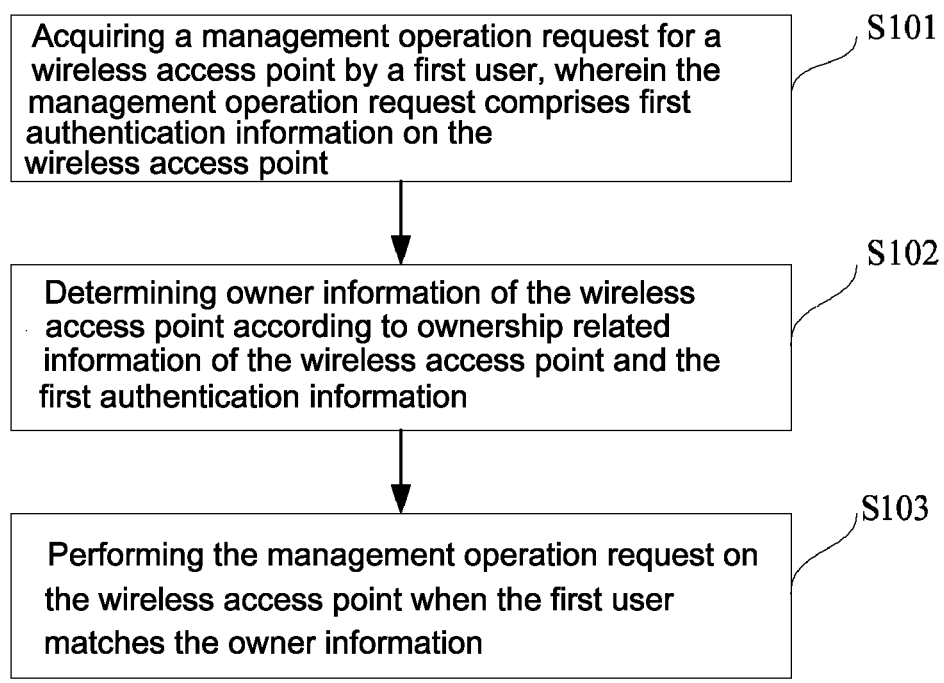
FIG. 2 is a flow chart of a preferred method for managing a wireless access point provided in embodiments of the present application.

Further, the embodiment of the present application further provides a preferred method for managing a wireless access point, the specific steps of which are shown in FIG. 2 comprising:

step S201, acquiring a management operation request concerning a wireless access point made by a first user, wherein the management operation request comprises first authentication information about the wireless access point;

step S202, determining owner information about the wireless access point according to ownership related information about the wireless access point and the first authentication information;

and step S203, executing the management operation request on the wireless access point when the first user matches the owner information.

According to the above-mentioned method, the first authentication information concerning the wireless access point can be directly carried in the management operation request; after the owner information is determined by means of the first authentication information and the ownership related information about the wireless access point, if the first user matches the owner information, relevant management can be directly performed on the wireless access point according to the management operation request this time, thereby avoiding the situation where there is a need to send authentication information one time and then to send the management operation request after the authentication is passed, simplifying the user's operation and improving the management efficiency.

For a wireless access point, after being feely shared by a merchant to customers coming into the store, the user equipments of the customers (such as mobile phones, tablet computers, etc. that the customers carry around) all can access the wireless access point. Therefore, the method for managing a wireless access point provided in the embodiments of the present application further comprises: providing owner information-related information to a user equipment wirelessly connected to the wireless access point. The owner information-related information may comprise the name of a merchant, the reputation of the merchant, the promotions of the merchant, information about a route to the merchant, etc., so that customers can conveniently learn the relevant information about the owner of the wireless access point through their own user equipments.

Figure 3:
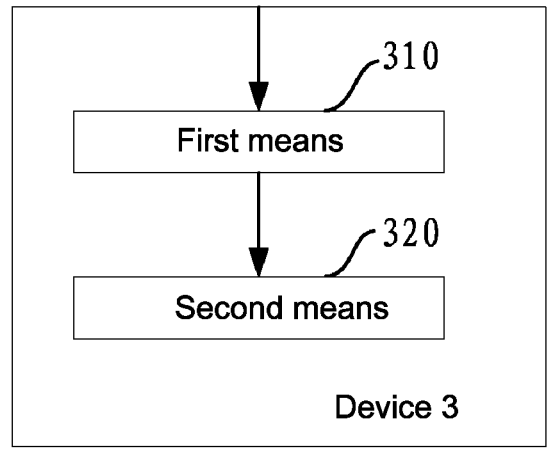
FIG. 3 is a schematic structural diagram of a device for managing a wireless access point provided in embodiments of the present application.

Based on another aspect of the present application, the embodiment of the present application further provides a device for managing a wireless access point, and the structure of the device 3 is as shown in FIG. 3, comprising a first means 310 and a second means 320. Specifically, the first means 310 is used to acquire first authentication information concerning a wireless access point provided by a first user; and the second means 320 is used to determine owner information about the wireless access point according to ownership related information about the wireless access point and the first authentication information.

Here, the device may be a management server of the wireless access point, and the management server comprises, but is not limited to, a network host, a single network server, a plurality of network server sets or a cloud computing-based computer set, or other implementations. Here, cloud is made up of a large number of host computers or network servers based on cloud computing, wherein the cloud computing is a kind of distributed computing, which is a virtual computer composed of a group of loosely coupled computer sets. The wireless access point is an access point of a mobile device of a user accessing a network, which may be for example a wireless-fidelity (WiFi) hotspot provided by a router.

The first user refers to a user who uses a mobile terminal to connect to a management server of a wireless access point and sends authentication information to the management server to attempt to acquire an ownership right of the wireless access point. The first authentication information refers to information sent by the aforementioned first user to the management server for authenticating the ownership right, the information being related to the wireless access point, the higher the priority thereof, indicating that the higher the degree of control of the wireless access point by the first user is, and accordingly, the greater the likelihood that the first user is determined to be the owner of the wireless access point.

In different scenarios, the ownership related information about the wireless access point may be at least one of the following:

ownership-pending state information about the wireless access point;

current authentication information provided by the current owner of the wireless access point; and second authentication information concerning the wireless access point provided by a second user.

For example, in a first case, where the ownership related information about the wireless access point is the ownership-pending state information about the wireless access point, the second means 320 is specifically configured to use the first user as the owner about the wireless access point. When a wireless access point does not currently have an owner, the wireless access point would be in an ownership-pending state, and the management server would store ownership-pending state information about the wireless access point, i.e. indicating that the wireless access point is in the ownership-pending state, and there is no owner at the moment. When the first authentication information (i.e., the first authentication information concerning the wireless access point provided by the first user) is acquired, a user who sends the first authentication information can be directly used as the owner, without making a comparison and determination, saving the processing time.

As another example, in a second case, where the ownership related information about the wireless access point is the current authentication information provided by the current owner of the wireless access point, the second means 320 is specifically configured to use the first user as the owner about the wireless access point when the first authentication information has a priority higher than that of the current authentication information. When a wireless access point currently has an owner, in this case different from the former case, the management server does not have ownership-pending state information about the wireless access point but would store the current authentication information provided by the current owner of the wireless access point. By taking a wireless access point A as an example, if the current owner thereof is a user a and the priority of authentication information a (i.e., the current authentication information) provided by the user a for acquiring an ownership right of the wireless access point A is 2, when the management server receives authentication information b (i.e., the first authentication information) concerning the wireless access point A from another user b (i.e., the first user) and the priority of the authentication information b is 3, the user b is saved as the owner information about the wireless access point because the priority of the authentication information b is higher than the priority of the authentication information a. Assuming that the authentication information a and the authentication information b have the same priority, different rules may be used depending on different scenario requirements. For example, if the priorities of the authentication information a and the authentication information b are identical in the present embodiment, the owner of the wireless access point A will not be changed, and the ownership right of the wireless access point A still belongs to the user a.

As still another example, in a third case, where the ownership related information about the wireless access point is the second authentication information concerning the wireless access point provided by the second user, the second means 320 is specifically configured to use, by comparing the priorities of the first authentication information and the second authentication information, a user corresponding to the authentication information with a high priority as the owner about the wireless access point. Here, the second user also represents a user who uses a mobile terminal to connect to a management server of a wireless access point and sends authentication information to the management server to attempt to acquire an ownership right of the wireless access point, and the actual number of second user(s) may be either one or multiple.

In the aforementioned two cases, the determination processing of the owner information about a wireless access point is triggered by reception of the first authentication information concerning the wireless access point provided by the first user, that is, each time the authentication information concerning the wireless access point provided by the user is acquired, the determination processing is performed to determine the owner information. In the practical use, it is also possible to perform the determination processing of the owner information after receiving authentication information from a plurality of users, and the specific trigger condition may be based on a pre-set time or may be based on the number of pieces of received authentication information. For example, the number of pieces of received user authentication information is checked at intervals, if the user information is not received, no processing would be performed; if only one piece of authentication information is received, the processing may be performed with reference to the aforementioned first or second case; and if more than one piece of authentication information is received, the priorities of these authentication information are compared, and the user corresponding to the authentication information with a high priority is used as the owner information about the wireless access point. For the case of triggering according to the number of pieces of received authentication information, the comparison is made only when a set number (e.g., two, three, etc.) of pieces of authentication information is acquired, so as to determine the owner information about the wireless access point. In addition, in such a case, if the wireless access point currently has an owner, the current owner may also be used as one of the second users to compare the priorities of the authentication information so as to determine the owner information about the wireless access point.

Further, the authentication information, comprising the first authentication information about the first user, the second authentication information about the second user and the current authentication information about the current owner, may comprise at least one of the following: an access password for the wireless access point, an MAC address corresponding to the wireless access point, device nameplate information corresponding to the wireless access point, information on modification successfully operated about an SSID of the wireless access point, and information on modification successfully operated about the access password for the wireless access point. The access password for the wireless access point is a password required to be input when a mobile device of a user establishes a connection with the wireless access point. The MAC address corresponding to the wireless access point is an MAC address of a physical device corresponding to the wireless access point. The device nameplate information corresponding to the wireless access point, i.e. the information on the nameplate of the physical device corresponding to the wireless access point, may be, for example, one of or a combination of more than one of a manufacturer, a product model, an MAC address, a serial number or a radio transmission device type approval code (CMIIT ID). The information on modification successfully operated about the SSID of the wireless access point indicates that the user is capable of modifying the SSID of the wireless access point and submit the modified SSID. By taking a wireless access point provided by a router as an example, the user may submit a login account and a login password for the router corresponding to the access point to indicate that the user is capable of modifying the SSID of the wireless access point, and in this example the information on modification successfully operated about the SSID of the wireless access point is the login account, the login password and the modified server identifier of the router corresponding to the wireless access point. The information on modification successfully operated about the access password for the wireless access point indicates that the user can modify the access password for the wireless access point and submit the modified access password. Still by taking the wireless access point provided by a router as an example, since the user submits a login account and a login password for the router corresponding to the access point to indicate that the user is capable of modifying the access password for the wireless access point, and in this example the information on modification successfully operated about the access password for the wireless access point is the login account, the login password and the modified access password for the router corresponding to the wireless access point.

In the practical use, by rationally setting the priorities of authentication information, the accuracy when determining owner information can be improved. For example, in the present embodiment, for the above-mentioned authentication information, the priorities are set successively, from low to high: the access password for the wireless access point, the MAC address corresponding to the wireless access point, the device nameplate information corresponding to the wireless access point, the information on modification successfully operated about the SSID of the wireless access point and the information on modification successfully operated about the access password for the wireless access point. Still by taking the wireless access point A as an example, the authentication information a provided by the current owner of the wireless access point A, i.e. the user a, for acquiring the ownership right of the wireless access point A is the access password for the wireless access point, and the received authentication information b concerning the wireless access point A from another user b is the information on modification successfully operated about the access password for the wireless access point A. Since the priority of the information on modification successfully operated about the access password for the wireless access point A is higher than that of the access password for the wireless access point A, the user b is used as the owner information about the wireless access point A.

Further, when the first authentication information is the device nameplate information corresponding to the wireless access point, the first means 310 is specifically used to receive a device nameplate photo corresponding to the wireless access point from the first user, and to identify and acquire the device nameplate information corresponding to the wireless access point from the device nameplate photo. The device nameplate photo is a nameplate photo of a device providing the wireless access point photographed by the user, such as a nameplate on a router device. The information displayed on the nameplate would generally comprise the following contents: a manufacturer, a product model, an MAC Address, a serial number, a radio transmission device type approval code, etc. In the practical use, one or more of the above contents can be recognized by the device nameplate photo as the device nameplate information by means of various types of image recognition methods. Compared with the direct acquisition of the device nameplate information, since the acquisition of the device nameplate photo is more difficult, an ordinary user generally cannot provide same, for example, in the scenario where a merchant freely shares a wireless access point, a place where the router corresponding to the wireless access point is placed is generally only known to the merchant, that is, the ordinary user cannot easily photograph the nameplate photo of the router. Even if the ordinary user temporarily becomes an owner of the wireless access point shared by the merchant by sending an access password for the wireless access point, the merchant can also re-obtain the ownership right of the wireless access point by submitting the device nameplate photo, thereby improving the accuracy when determining the owner of the wireless access point and reducing the possibility of erroneous determination.

Furthermore, the first means 310 may also be specifically used to receive the first authentication information concerning the wireless access point provided by the first user, to verify the first authentication information, and to acquire the verified first authentication information. In the practical use, since the number of wireless access points that need to be managed is often very large, if the owner information is determined for each received first authentication information, it will need to take up a large amount of processing resources. Therefore, when the first authentication information concerning the wireless access point provided by the first user is received, the first authentication information can be verified, and if the verification of the first authentication information is not passed, the first authentication information received this time can be directly discarded, and then the subsequent processing is not performed. Only when the verification of the first authentication information is passed, the first authentication information is acquired as a basis for subsequent determination of owner information. Still by taking the aforementioned wireless access point A as an example, if the management server receives an access password concerning the wireless access point A of a user c, the access password would be first verified. The specific verification mode may be using the access password received concerning the wireless access point A to be compared with a correct access password for the wireless access point A pre-stored in the management server, and if the access password received this time is consistent with the pre-stored correct access password, the verification is passed, otherwise the verification fails. The pre-stored correct access password for the wireless access point A may be uploaded by the owner of the wireless access point. By taking the current owner, the user b, of the wireless access point A as an example, after the user b becomes the current owner of the wireless access point A, the relevant verification information concerning the wireless access point A can be sent to the management server for verifying the subsequent authentication information, such as the correct access password and the correct device nameplate information.

Figure 4:
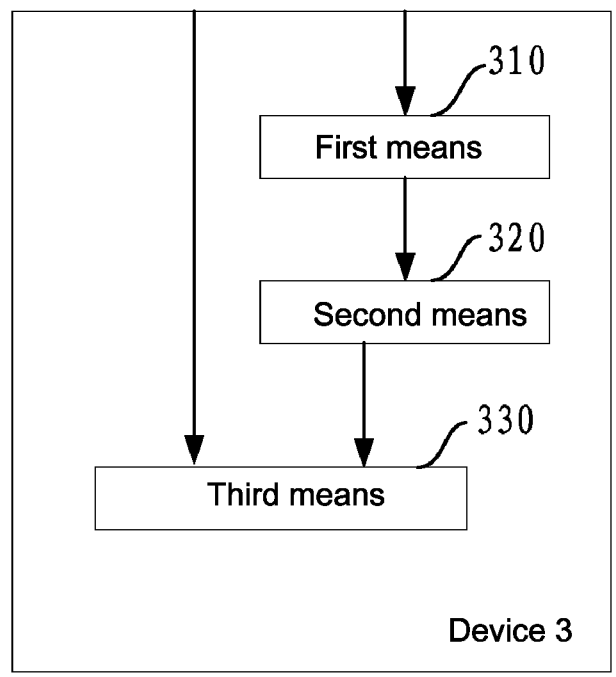
FIG. 4 is a schematic structural diagram of another device for managing a wireless access point provided in embodiments of the present application.

In the practical use, after determining an owner of a wireless access point, the owner can obtain a corresponding authority to manage the wireless access point. For example, by taking the scenario mentioned in the present embodiment as an example, the function of managing the wireless access point may be determining whether to share the wireless access point, to upload the verification information and to edit the introduction information concerning the wireless access point, such as the name of a merchant, the reputation of the merchant, the promotions of the merchant and information about a route to the merchant, etc. In order to implement the function of managing the wireless access point by a user, the embodiment of the present application provides another device for managing a wireless access point, and the structure of the device 3 is as shown in FIG. 4, further comprising a fourth means 340 in addition to the first means 310 and the second means 320 shown in FIG. 3. Specifically, the fourth means 340 is used to acquire a management operation request concerning the wireless access point made by a third user, and to execute the management operation request on the wireless access point when the third user matches the owner information. Here, it will be understood by those skilled in the art that the first means 310 and the second means 320 are respectively identical or substantially identical to the contents of the corresponding means in the embodiment of FIG. 3, and for the sake of brevity, the description thereof will not be repeated here and is hereby incorporated by reference. The third user only represents a user who sends a management operation request regarding a wireless access point, which may be the same user as the first user in the practical use, and may be a user relevant to the first user.

In the case where the third user is the same user as the first user, for example, for the aforementioned wireless access point A, the user b becomes the owner of the wireless access point A after sending the authentication information, the information having the unique identification function such as the user name and the user number of the user b may be used as the owner information about the wireless access point A. Since the information such as the user name or the user number is unique, the user name or the user number can be used as a basis for matching the owner information. In this case, only when the user name or the user number is consistent with the owner information, it will be determined to match the owner information, and therefore, only the management operation request is received from the user b, the management operation request will be performed.

In addition, in the case where the third user and the first user are the relevant users, still by taking the aforementioned wireless access point A as an example, it is assumed that the user b and a user d belong to the same group of users, for example, the two belonging to two different users of the same merchant, and a piece of identical information can be set in the information about the users, for example, the same group number, etc. When the user b is used as the owner about the wireless access point A, the group number of the user b may be used as the owner information about the wireless access point A. When the management operation request is received from the user d, the group number can be used as a basis for matching the owner information, and if the group number of the third user is consistent with the owner information, it is determined to match the owner information, and the management operation request from the user d could be executed in this case.

Figure 5:
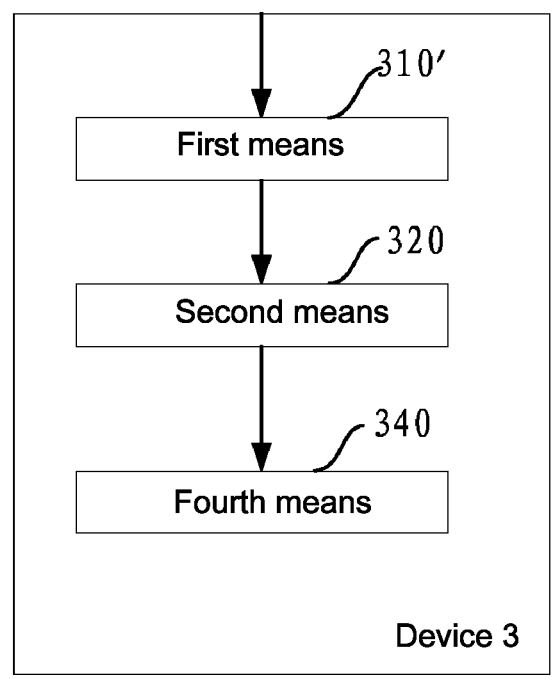
FIG. 5 is a schematic structural diagram of a preferred device for managing a wireless access point provided in embodiments of the present application.

Further, the embodiment of the present application further provides a preferred device for managing a wireless access point, and the structure of the device 3 is as shown in FIG. 5, comprising a first means 310', a second means 320 and a third means 330. Specifically, the first means 310' is used to acquire a management operation request concerning a wireless access point made by a first user, wherein the management operation request comprises first authentication information about the wireless access point; the second means 320 is used to determine owner information about the wireless access point according to ownership related information about the wireless access point and the first authentication information; and the third means 330 is used to execute the management operation request on the wireless access point when the first user matches the owner information. According to the above-mentioned device, the first authentication information concerning the wireless access point can be directly carried in the management operation request; after the owner information is determined by means of the first authentication information and the ownership related information about the wireless access point, if the first user matches the owner information, relevant management can be directly performed on the wireless access point according to the management operation request this time, thereby avoiding the situation where there is a need to send authentication information one time and then to send the management operation request after the authentication is passed, simplifying the user's operation and improving the management efficiency.

For a wireless access point, after being feely shared by a merchant to customers coming into the store, the user equipments of the customers (such as mobile phones, tablet computers, etc. that the customers carry around) all can access the wireless access point. Therefore, the device for managing a wireless access point provided in the embodiment of the present application further comprises a fifth means (not shown), the fifth means being used to provide the owner information-related information to a user equipment wirelessly connected to the wireless access point. The owner information-related information may comprise the name of a merchant, the reputation of the merchant, the promotions of the merchant, information about a route to the merchant, etc., so that customers can conveniently learn the relevant information about the owner of the wireless access point through their own user equipments.

In summary, in embodiments of the present application, first authentication information concerning a wireless access point provided by a first user is acquired, owner information about the wireless access point can then be automatically determined according to ownership related information about the wireless access point and the first authentication information, and an owner of the wireless access point can thus be conveniently determined. In addition, in different cases, the ownership related information may be ownership-pending state information about the wireless access point, current authentication information provided by the current owner of the wireless access point, or second authentication information concerning the wireless access point provided by a second user. Accordingly, in the solution of the present application, different manners may be used to complete the determination of the owner in combination with the first authentication information so as to adapt to different application scenarios, making the applicability of the solution better.

It is to be noted that the present application may be implemented in software and/or a combination of software and hardware, for example, implemented by using an application specific integrated circuit (ASIC), a general-purpose computer, or any other similar hardware device. In one embodiment, the software program of the present application may be executed by a processor to implement the steps or functions described above. Likewise, the software program (comprising the related data structure) of the present application may be stored in a computer-readable recording medium, such as an RAM memory, a magnetic or optical drive, or a floppy disk and similar devices. In addition, some of the steps or functions of the present application may be implemented in hardware, for example, as a circuit for cooperating with a processor to perform various steps or functions.

In addition, part of the present application may be applied as a computer program product, such as a computer program instruction, which, when executed by a computer, may invoke or provide, by means of the operation of the computer, the method and/or technical solution according to the present application. Moreover, the program instruction that invokes the method of the present application may be stored in a fixed or removable recording medium, and/or transmitted through a data stream in a broadcast or other signal carrying media, and/or stored in a working memory of a computer device running according to the program instruction. Here, one embodiment according to the present application comprises an apparatus, the apparatus comprising a memory for storing a computer program instruction and a processor for executing the program instruction, wherein when the computer program instruction is executed by the processor, the apparatus is triggered to run the aforementioned method and/or technical solution according to the multiple embodiments of the present application.

For a person skilled in the art, it is obvious that the present application is not limited to the details of the above-mentioned exemplary embodiments, and the present application can be implemented in other specific forms without departing from the spirit or essential features of the present application. Hence, no matter from what point of view, the embodiments should all be considered to be exemplary and non-restrictive, the scope of the present application is defined by the appended claims rather than the foregoing description, and therefore it is intended that all changes falling into the meaning and scope of equivalent elements of the claims should be comprised in the present application. Any reference signs in the claims should not be taken to limit the involved claims. In addition, it is obvious that the term "comprise" does not exclude other units or steps, and the singular does not exclude the plural. A plurality of units or devices described in the device claims may also be implemented by one unit or device via software or hardware. The terms "first", "second", etc. are used to express the name, and do not mean any particular order.

What is claimed is:

1. A method for managing a wireless access point, wherein the method comprises:
   acquiring first authentication information on a wireless access point provided by a first user; and
   determining owner information of the wireless access point according to ownership related information of the wireless access point and the first authentication information, wherein the ownership related information comprises current authentication information provided by a current owner of the wireless access point, and
   wherein determining owner information of the wireless access point according to ownership related information of the wireless access point and the first authentication information comprises:
      using the first user as the owner of the wireless access point when the first authentication information has a priority higher than that of the current authentication information.

2. A method for managing a wireless access point, wherein the method comprises:
   acquiring first authentication information on a wireless access point provided by a first user; and
   determining owner information of the wireless access point according to ownership related information of the wireless access point and the first authentication information, wherein the ownership related information comprises second authentication information on the wireless access point provided by a second user, and
   wherein determining owner information of the wireless access point according to ownership related information of the wireless access point and the first authentication information comprises:
      by comparing priorities of the first authentication information and the second authentication information, using the user corresponding to the authentication information with the higher priority as the owner of the wireless access point.

3. The method according to claim 1, wherein the first authentication information comprises at least one of the following:
   an access password for the wireless access point;
   an MAC address corresponding to the wireless access point;
   device nameplate information corresponding to the wireless access point;
   information on SSID modification successfully operated of the wireless access point; and
   information on access password modification successfully operated of the wireless access point.

4. The method according to claim 3, wherein priorities of the first authentication information are ranked from low to high as:
   the access password for the wireless access point;
   the MAC address corresponding to the wireless access point;
   the device nameplate information corresponding to the wireless access point;
   the information on SSID modification successfully operated of the wireless access point; and
   the information on access password modification successfully operated of the wireless access point.

5. The method according to claim 3, wherein the device nameplate information comprises at least one of the following: a manufacturer, a product model, an MAC address, a serial number, and a radio transmission device type approval code.

6. The method according to claim 3, wherein the first authentication information comprises the device nameplate information corresponding to the wireless access point;
   and wherein acquiring the first authentication information on the wireless access point provided by the first user comprises:
      receiving a device nameplate photo corresponding to the wireless access point from the first user, and identifying and acquiring the device nameplate information corresponding to the wireless access point from the device nameplate photo.

7. The method according to claim 1, wherein acquiring the first authentication information on the wireless access point provided by the first user comprises:
   receiving the first authentication information on the wireless access point from the first user; and
   verifying the first authentication information, and acquiring the verified first authentication information.

8. The method according to claim 1, wherein acquiring the first authentication information on the wireless access point provided by the first user comprises:
   acquiring a management operation request for the wireless access point by the first user, wherein the management operation request comprises the first authentication information on the wireless access point;
   and wherein the method further comprises:
      performing the management operation request on the wireless access point when the first user matches the owner information.

9. The method according to claim 1, wherein the method further comprises:
   acquiring a management operation request for the wireless access point by a third user, and
   performing the management operation request on the wireless access point when the third user matches the owner information.

10. The method according to claim 1, wherein the method further comprises:
    providing owner information-related information to a user equipment wirelessly connected to the wireless access point.

11. A non-transitory computer-readable medium storing instructions, which when executed by one or more processors, cause an a computer at least to:

acquire first authentication information on a wireless access point provided by a first user; and determine owner information of the wireless access point according to ownership related information of the wireless access point and the first authentication information, wherein the ownership related information comprises current authentication information provided by a current owner of the wireless access point, and wherein determining owner information of the wireless access point according to ownership related information of the wireless access point and the first authentication information comprises:

using the first user as the owner of the wireless access point when the first authentication information has a priority higher than that of the current authentication information.

12. An apparatus, comprising:
a memory; and
one or more processors executing instructions stored in the memory to cause the apparatus to:

acquire first authentication information on a wireless access point provided by a first user; and determine owner information of the wireless access point according to ownership related information of the wireless access point and the first authentication information, wherein the ownership related information comprises second authentication information on the wireless access point provided a the second user, and wherein determining owner information of the wireless access point according to ownership related information of the wireless access point and the first authentication information comprises:

by comparing priorities of the first authentication information and the second authentication information, using the user corresponding to the authentication information with the higher priority as the owner of the wireless access point.

* * * * *